Jan. 5, 1926. 1,568,130
H. BLACKWELL
MULTIDISK PHONOGRAPH
Filed Oct. 7, 1921  10 Sheets-Sheet 2

INVENTOR
H. Blackwell.
BY
H. Umship Wheatley
ATTORNEYS

Jan. 5, 1926.

H. BLACKWELL

MULTIDISK PHONOGRAPH

Filed Oct. 7, 1921

INVENTOR
H. Blackwell.
BY
H. Winship Wheatley
ATTORNEYS

Jan. 5, 1926.

H. BLACKWELL 1,568,130

MULTIDISK PHONOGRAPH

Filed Oct. 7, 1921

INVENTOR
H. Blackwell.
BY
ATTORNEYS

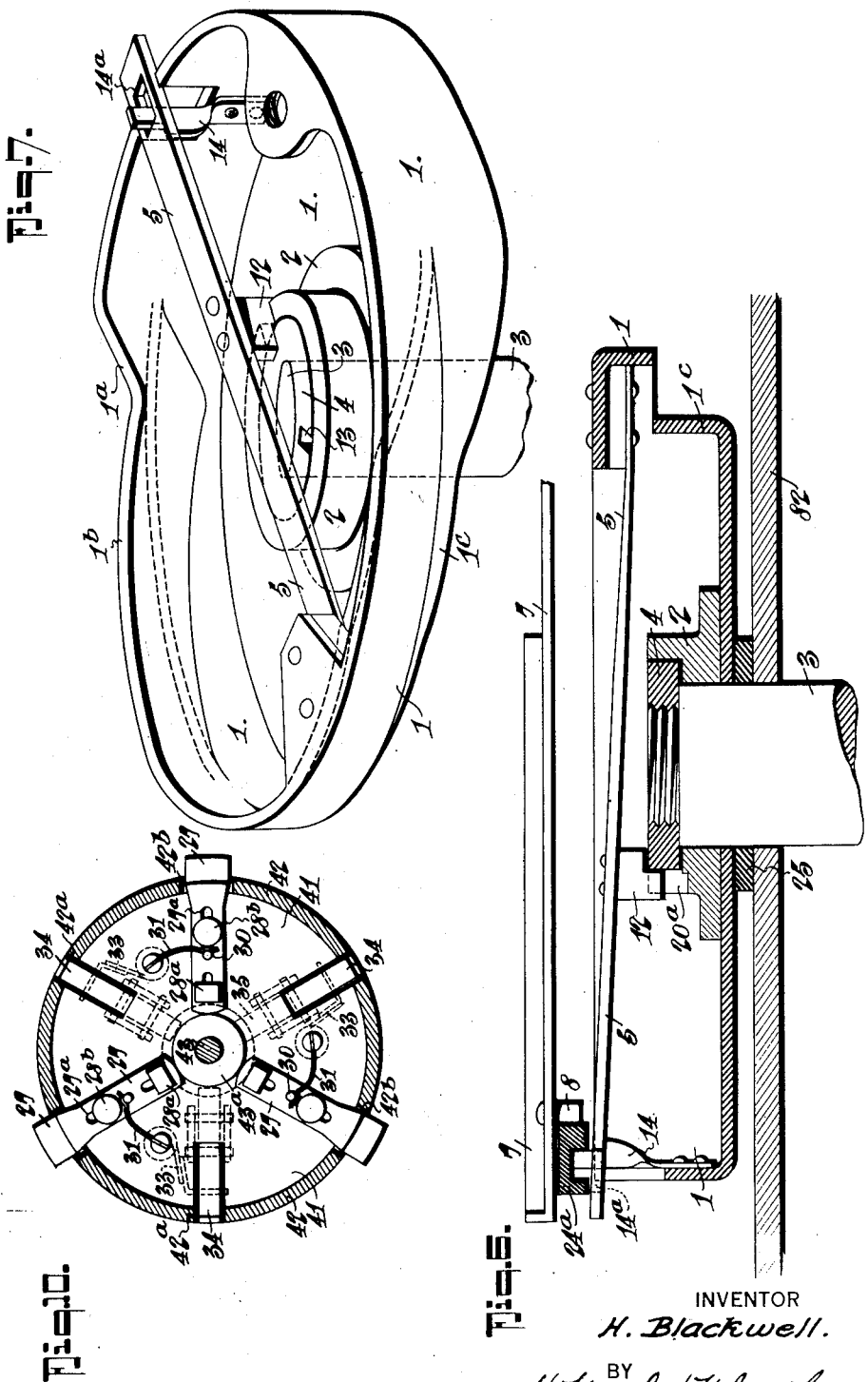

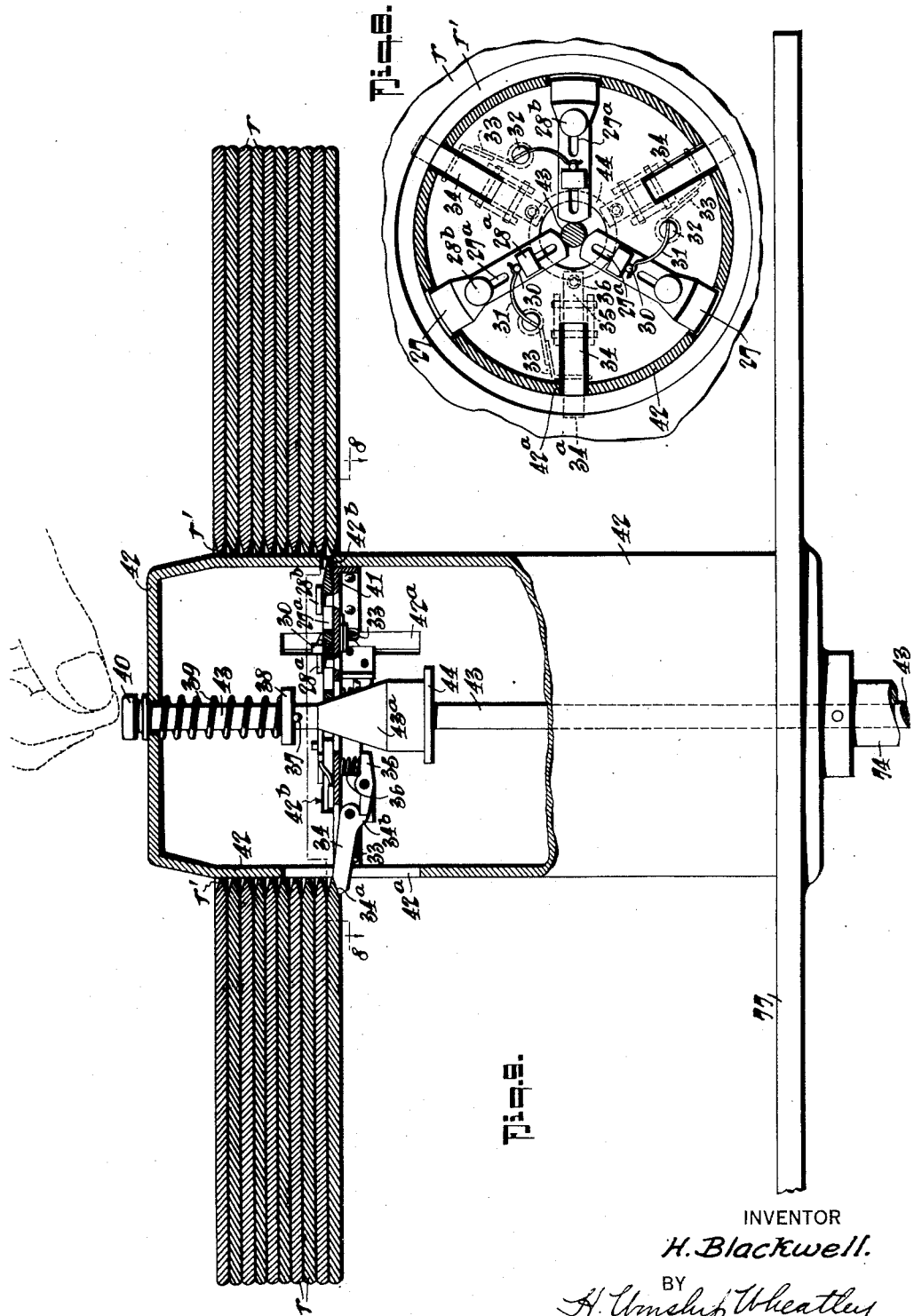

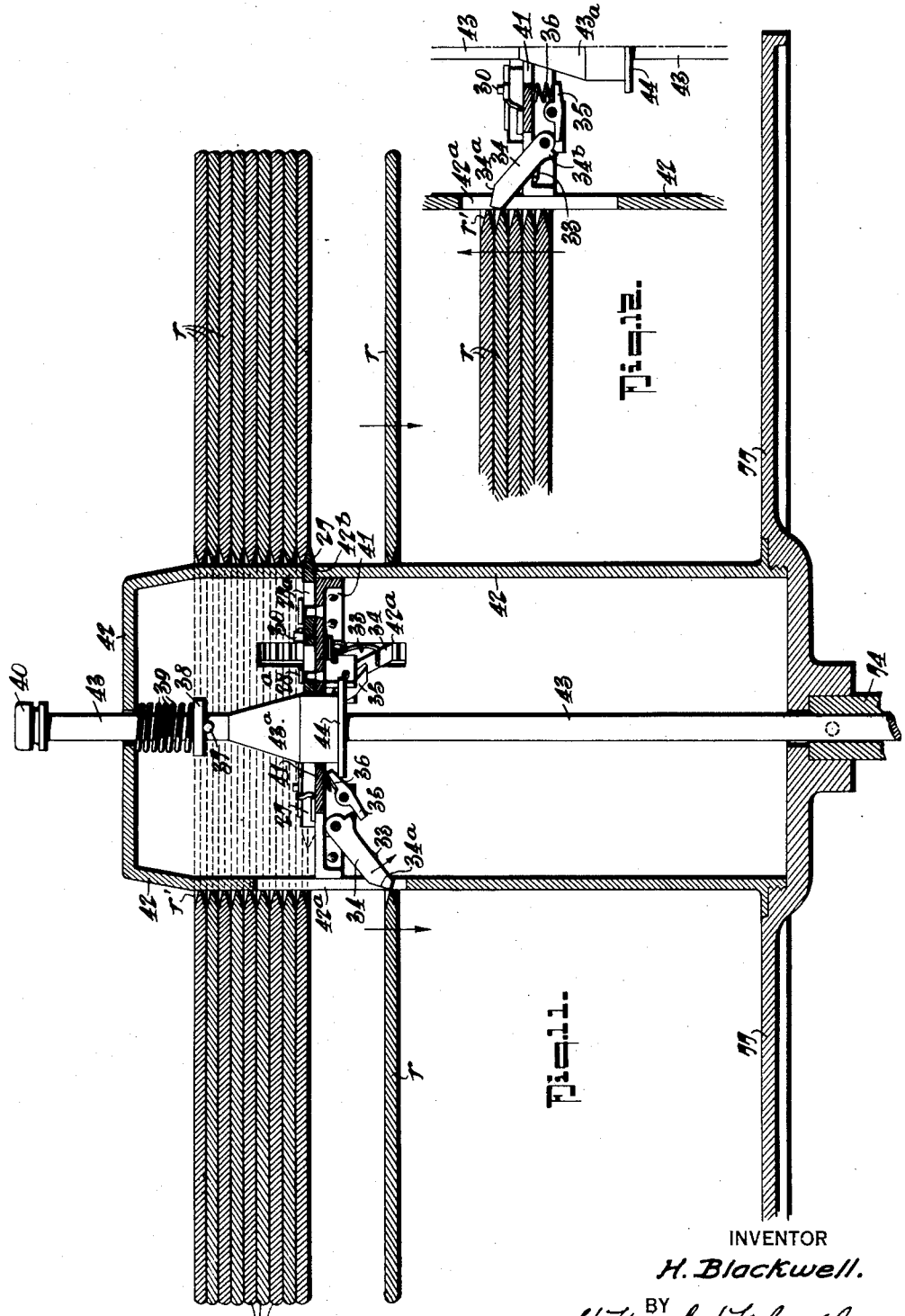

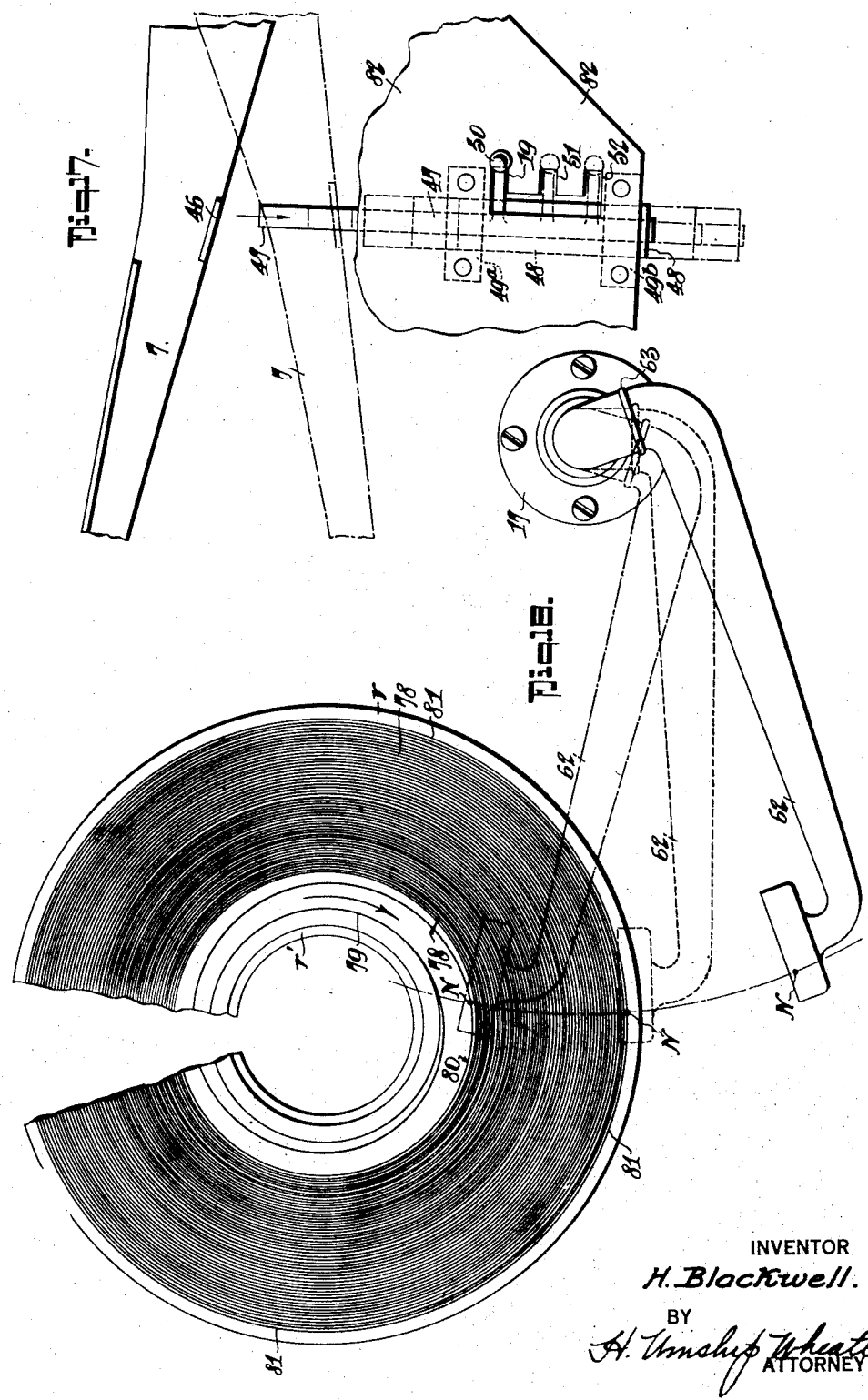

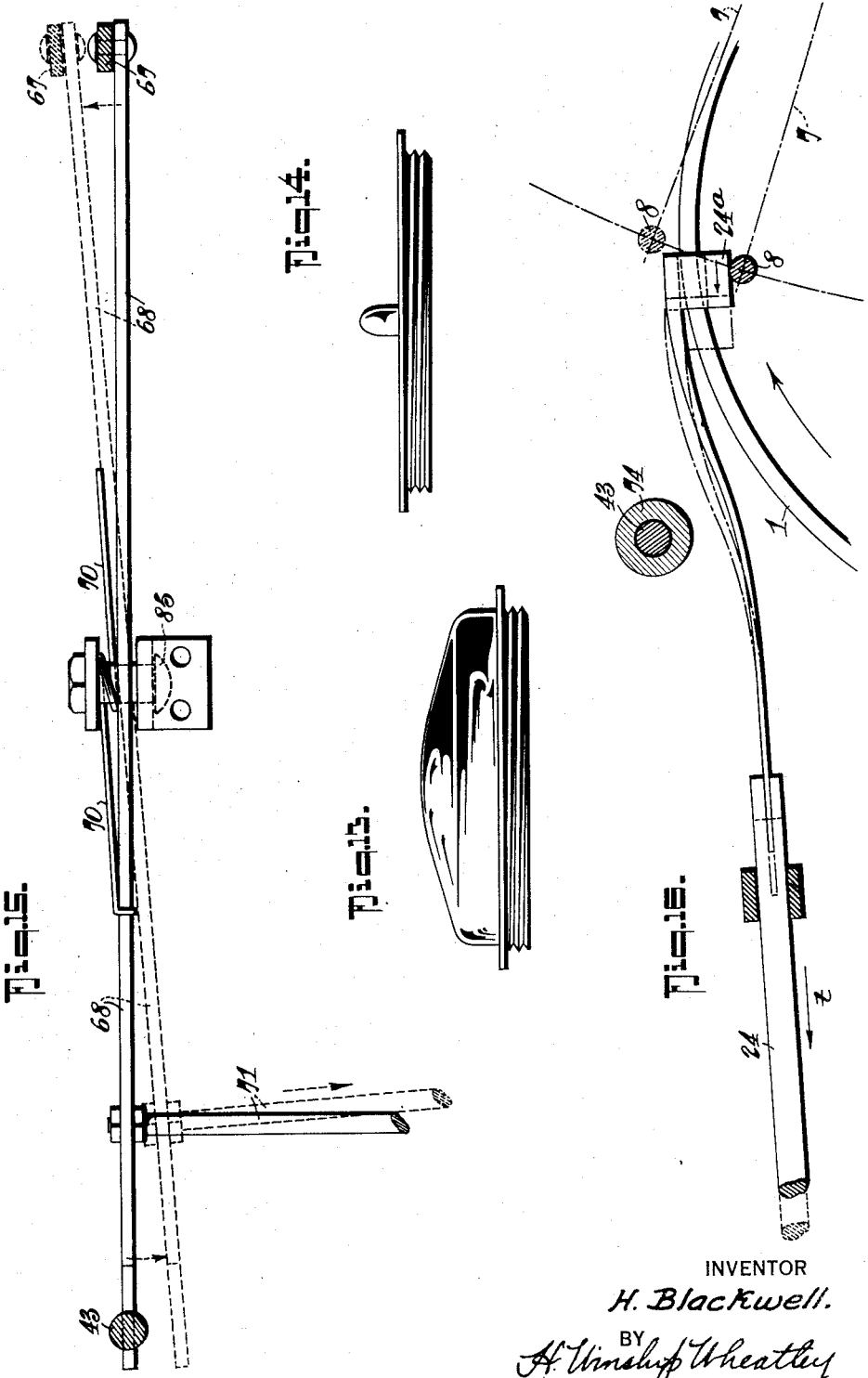

Patented Jan. 5, 1926.

1,568,130

UNITED STATES PATENT OFFICE.

HOWARD BLACKWELL, OF YOUNGSTOWN, OHIO.

MULTIDISK PHONOGRAPH.

Application filed October 7, 1921. Serial No. 505,998.

*To all whom it may concern:*

Be it known that I, HOWARD BLACKWELL, a citizen of the United States, residing at Youngstown, in the county of Mahoning and State of Ohio, have invented a new and Improved Multidisk Phonograph, of which the following is a specification.

This invention relates to improvements in self-operating sound reproducing machines, graphophones, of the type wherein provision is made for playing, in succession, a plurality of records automatically, that is,—without the need of any action on the part of the operator, and primarily my said invention seeks to provide certain improvements in machines of this type, whose operating parts are so designed and cooperatively combined, to the end, that the mechanism is simplified and is rendered of a relatively economical construction; in which those parts, other than are usually present in the modern types of machines of the character stated, are so compactly assembled that the space occupied by my improved machine is not appreciably greater than occupied by the conventional type of graphophone.

Another object of my invention is to provide an improved sound reproducing machine of the character described, having a simple and positively operating means for sustaining a stack of record disks, and simple adjustable devices for rendering the operating mechanism in condition for playing record disks of either ten inch or twelve inch sizes and in which simple and improved means are provided whereby to set the mechanism for replaying any record.

With other objects in view, that will hereinafter be stated and understood as the reading of the following description progresses, my invention embodies generally in a machine of the character stated, an improved means for automatically setting into action mechanism that governs the operation of certain multi-disk records supporting mechanism and adapted for releasing one of the said records, at a time, to permit it to assume a position for being engaged by the reproducing needle, as the tone arm is reset to bring said needle into engagement with the outermost or entrant end of the tone groove of the said released and positioned disk record.

In its more complete nature, my invention includes means for adjusting the automatic return of the tone arm to the position of commencement of the record disk groove, to the end that the limit of such outward movement is regulated, accordingly as to whether 12 inch or 10 inch diameter records shall be played.

In its more subordinate nature, my invention resides in the embodiment of certain features of construction and peculiar combination of parts, all of which will be fully understood from the following detailed explanation thereof, as specifically set out in the appended claims and as illustrated in the accompanying drawings, in which:

Figure 1 is a top plan view of my construction of multi-disk phonograph, parts of the upper and lower supporting framing plates, portions of the tone arm and the record table being broken away; the upper portion of the records storage cylinder being shown in horizontal section, the tone arm being positioned at the finish of the record groove and when its needle is about to approach the supplemental curved grooves on the records for the rapid finishing of the inward movement of the said tone arm.

Figure 6 is a detail cross section of the main operating cam, its attached parts and other cooperating portions hereinafter specifically mentioned.

Figure 7 is a detail perspective view of the cam disk member shown in Figure 6.

Figure 8 is a horizontal section of the records storage member taken substantially on the line 8—8 on Figure 9, a portion of the records stack being indicated in dotted lines.

Figure 9 is a detail vertical section of the same and the turntable, the parts being shown operatively positioned as in Figure 8.

Figure 10 is a detail horizontal section, similar to Figure 8, the parts being shown in the "lowermost record" releasing position with the slide dogs extended for supporting the rest of the record pack.

Figure 11 is a view similar to Figure 9, the parts being positioned as in Figure 10.

Figure 12 is a detail fragmentary section that illustrates the position that the mechanism assumes, in order to permit of the ready removal of the record pack after the same has been played.

Figure 1:
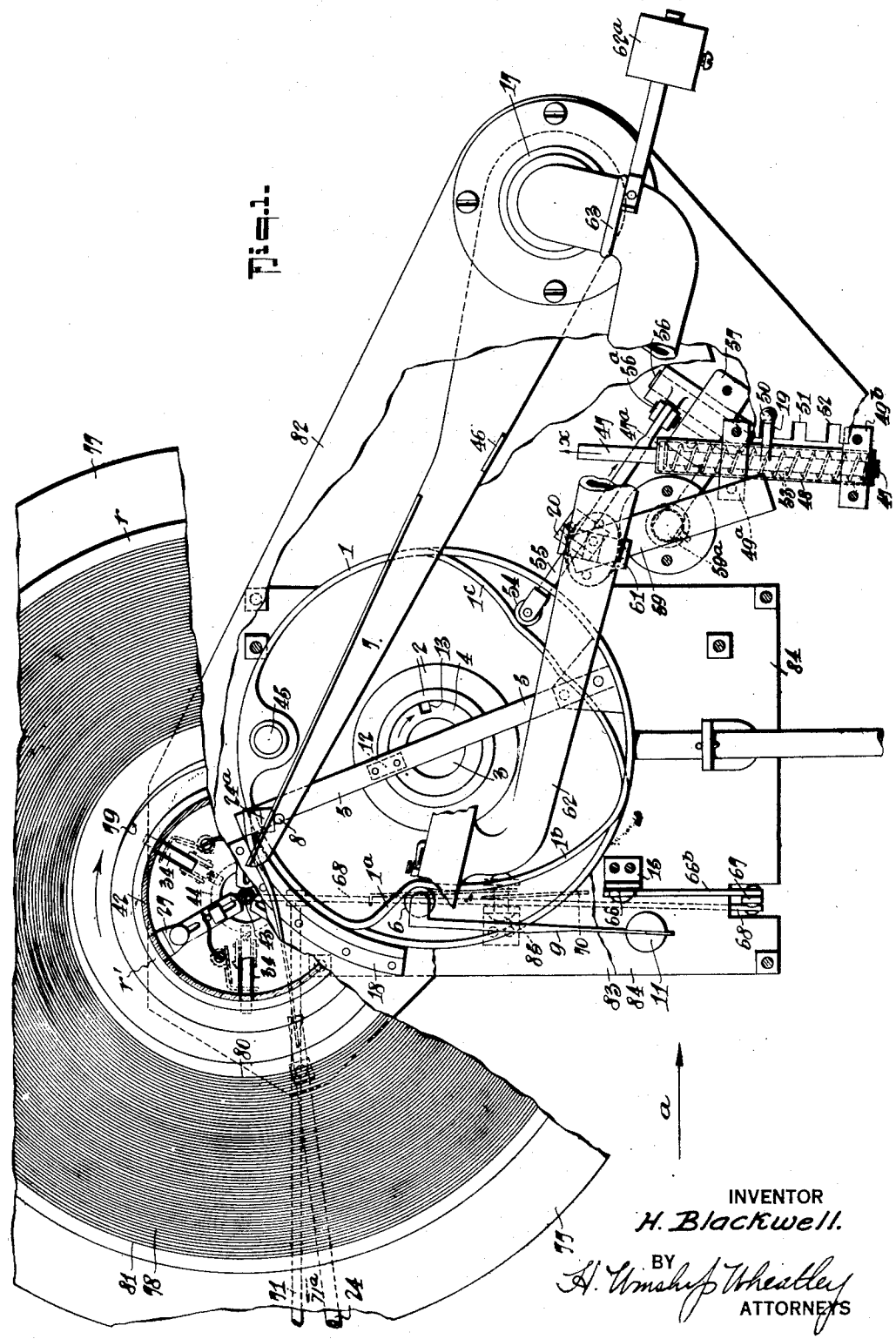

Figures 13 and 14 designate side elevations of closure caps for the threaded socket in the record turntable, when the record storage or holder member is removed and the machine is adjusted for playing a single record disk, as ordinarily.

Figure 15 is a detail diagrammatic plan view, which illustrates the manner in which the parts are adjusted for throwing out of operation the records dropping mechanism.

Figure 16 is a similar view illustrating the manner in which the parts are adjusted for throwing out of operation the disk arm controlling mechanism.

Figure 17 is a detail plan view illustrating the adjustments of the adjustable arm pusher rod, and Figure 18 is a somewhat diagrammatic plan view illustrating the various movements of the tone arm.

As the operation of the multi-disk holding and releasing mechanism, hereinafter referred to, is automatically controlled by the movement of the tone arm as it receives a final or quick impetus at the finish of playing of the record, and through such movement it sets into action the various devices that cooperate with the record disk holding mechanism and the means that, at predetermined times, operate to release the next one of the stack of records to be played, I shall begin the description of the structural parts that constitute the essentials of my improvements, by referring first to the tone arm, since the main mechanism of the talking machine differs from the conventional types of graphophones only in such details that will be pointed out in the specifications following.

The machine may be built for any number of records but in the present showing of my invention a ten record machine is shown.

Assuming that the machine is adapted to play 10 inch records, the tone arm 62 is swung out so it clears all of the records. The pack of records is placed upon what is hereinafter termed "the record storage 42," and a small knob 40, hereinafter further referred to, is pulled upwardly for dropping one record disk on the rotatable record table 77. (See Fig. 3.)

47 designates an adjustable rod that is longitudinally movable through a casing 48, the said rod having a shoulder flange $47^a$ (see Figure 1) which is engaged by a coil spring 53, within the casing, that tends to normally force the rod 47 outwardly, in the direction of the arrow $x$. A handle 50 projects laterally from the casing 48 and it is adapted for being swung into the notch 19 of the top plate 82 of the framing to the under side of which the casing is supported by bearings $49^a$—$49^b$, as is clearly indicated in Figures 1, 4 and 5, in which bearings the casing 48 has endwise movement in the manner and for the purposes hereinafter explained.

When the handle 50 is adjusted in the notch 19, it corresponds to the position required for playing a 10 inch record. 51—52 designate other notches in the plate 82 for receiving the handle 50, the one 51 corresponding to the position required for adjusting the mechanism for playing a 12 inch record. The purpose of the other notch or slot 52 will be hereinafter explained.

Assuming now the first record has been played to the final groove line 80 of the disk; when at this position, the reproducing needle is brought rapidly by the spiral groove on the record, to a groove line 79, see Figure 1, which line is of the same diameter on all records, whether 10 inch or 12 inch. In Figure 1, the tone arm is shown positioned so its needle is on the spiral groove 78 in the disk and is about to approach the other line 79. It should be here mentioned that when the needle is at the point stated, the record table 77 is operating at a speed of approximately 78 revolutions per minute, in a clockwise direction. Another shaft 3, hereinafter termed "a driving shaft", since it is the shaft that imparts motion to the main operating cam and other sub-mechanisms hereinafter specifically mentioned, terminates at the upper end in a threaded portion upon which is received a collar 4, and said shaft 3 with the collar 4 is caused to revolve in the same clockwise direction, as the table 77, and at approximately 2.6 revolutions per minute, or a ratio of approximately 1—30 (see Fig. 3). The shaft 3 and collar 4 revolve freely in bearing 26, frame plate 83, collar 25 and the bearing 2 of a cam 1, the latter being held in the position shown in Figure 1 by a roller 6 that is pressed into a peripheral depression in the cam frame which includes an abrupt cam surface $1^a$ and a gradual incurved surface $1^b$ that merges with the cam surface 1ª, as shown. Roller 6 is held under tension to the position shown in Figure 1 by a spring holder 9 that is fastened to a post 11 on the frame plate 83.

A flat plate spring 5 is fastened at one end to the cam 1, (see Figures 1, 6 and 7) with a downward tension on the spring. To this spring is riveted a small detent block 12, a part of which, at all times, extends downwardly into a notch 20ª in the top surface of the cam bearing 2, (see Figure 6). Block 12 is held up so that half of its under edge is just clear of the slowly revolving collar 4, by a spring snap 14 which engages a slot 14ª in the outer free end of the spring 5, as is shown in detail in Figure 7.

Figure 3:
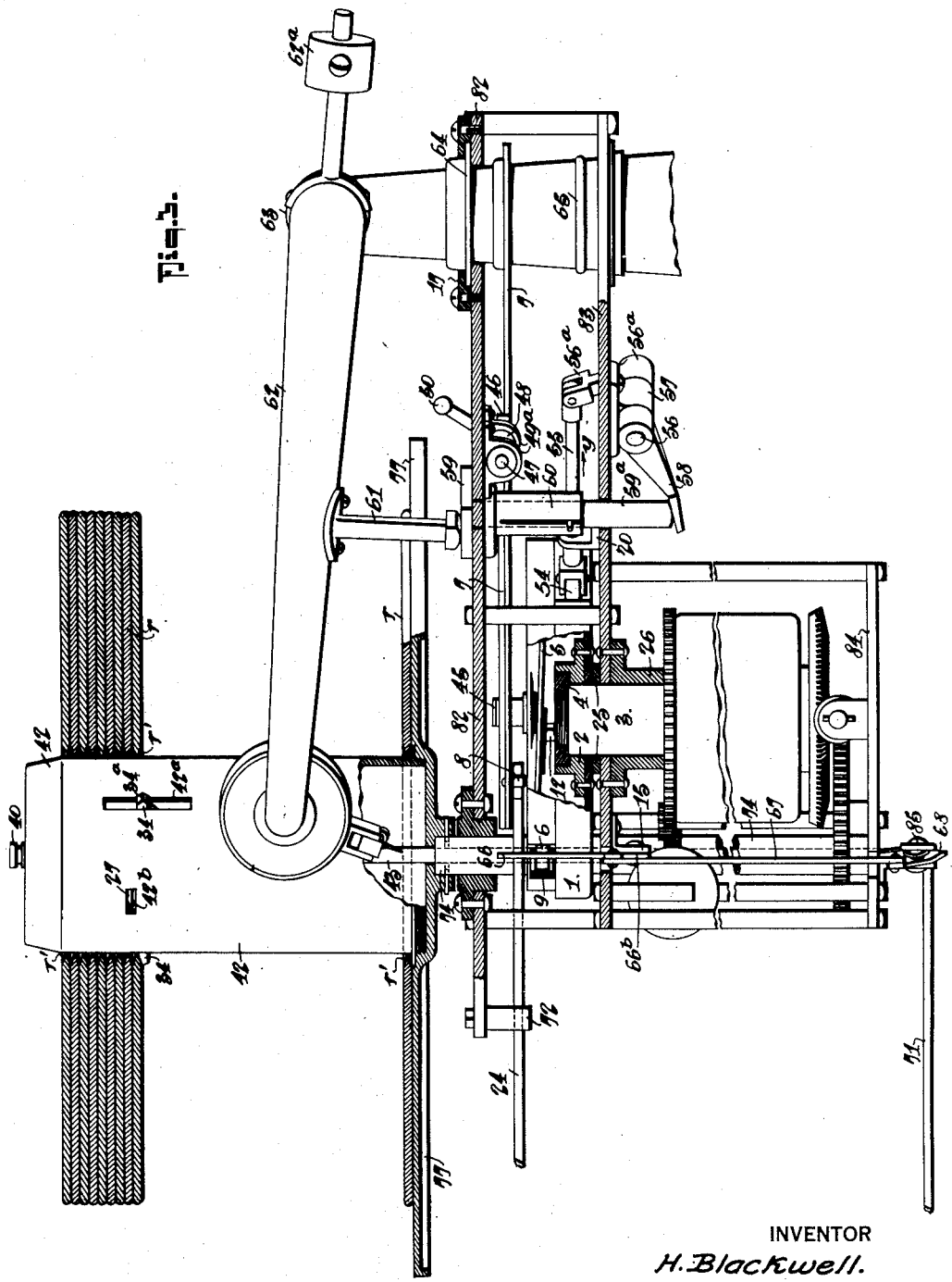
Figure 3 is a front side elevation of my multi-disk phonograph, the parts being shown positioned as they appear on Figure 1, portions of the main frame, the record disk table, and the record disk pack being shown partly in section.

A long horizontally disposed rod 24, that is located in a plane just above the cam 1, extends to the front of the machine and passes through a small guide bearing 72 pendent from the top frame plate 82, as is shown in Figure 3, and from the said bearing 72 inward the rod is more or less flexible for reasons presently to be understood. The inner end of the said rod 24 has an angled portion 24ª which engages a pin 8 pendent from an arm 7 that is fastened to and moves with the vertical portion of the tone arm 62, the latter being joined at 63 to swing in the vertical plane and is vertically balanced by a counterweight 62ª. The vertical portion of the tone arm is jointed at 65 and swings horizontally around a bearing 64 that is firmly held in place on the front plate 82 by a ring clamp 17 that is screwed on the said frame plate 82, as shown.

Assuming the tone arm to be moving horizontally inward, as the reproducing needle approaches the innermost groove 79 in the record, it carries with it the arm 7 in like inward direction, and as the said arm 7 approaches the limit of its inward movement, its pendent pin 8 presses against the angled or head portion 24ª of the arm 24 which, being flexible, as before stated, permits its pressure to be transmitted to the spring snap 14, to disengage it from the spring 5, see Figure 6. As the spring snap 14 is itself released from the spring 5, the tension of the said spring 5 forces the detent block 12 down until the higher half thereof rests upon the moving collar 4 and as soon as the notch 13 of the said collar comes around in register with the block 12, the tension of the spring 5 presses the high portion of the detent block 12 into the said notch 13, and thereby causes cam 1 to move with the collar, in clockwise direction.

The parts being in the position shown in Figure 1, as soon as the cam 1 begins to rotate, a roller 54 on a rod 55 begins to move out from the cam portion 1ᶜ and this movement of the roller 54, through the rod 55, is transmitted to a crank arm 56ª that is pinned to a short horizontal shaft 56 journaled in a bearing 57 secured to the underside of the frame plate 83.

58 designates another crank arm pinned on the outer or front end of the shaft 56, as is clearly shown in Figure 3, from which it will be readily apparent that as movement is imparted to the rod 55, (see arrow y) the said movement is transmitted to the shaft 56 to cause it to rock the crank arm 57 and thereby transmit motion through a rod 59ª that passes up through a tubular guide 60 and connects with a table 59 located above the plate 82 and upon which normally rests a leg or post 61 attached to the tone arm 62, as shown.

It should be here mentioned that 20 designates a bracket support for the rod 55 and it is attached to the lower frame plate 83, as is clearly shown in Figure 3.

Figure 2:
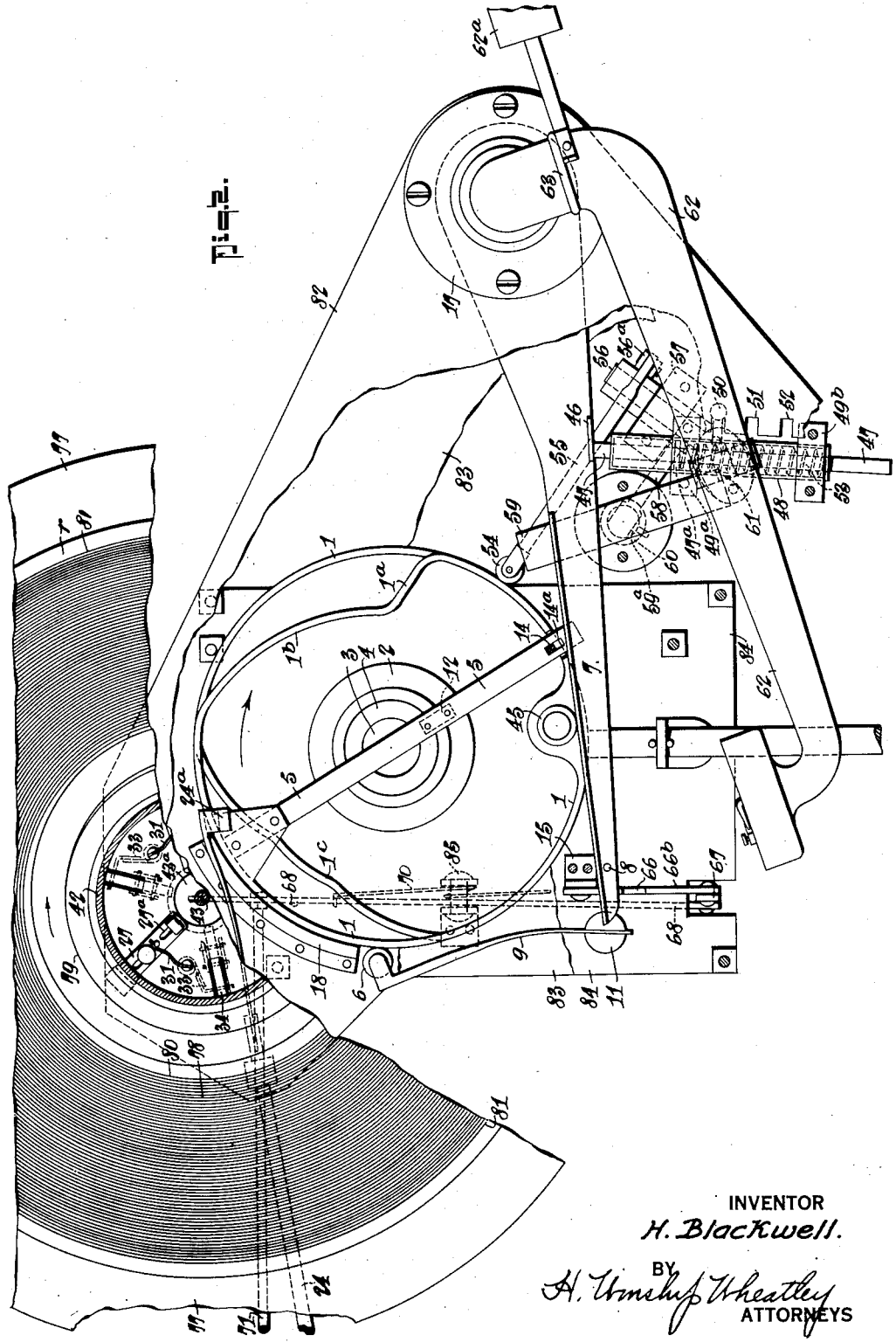
Figure 2 is a view similar to Figure 1, the tone arm being near its outermost position, with its attached or supplemental member moved into engagement with the crank lever devices that control the record changing mechanism, the other shiftable and cooperating parts being shown in their relatively changed positions.

Referring again to the roller 54, after such roller has reached the outside diameter of the cam 1, and the tone arm has been elevated to a point as before stated, a roller pin 45 on the said cam 1 begins to contact with the arm 7, moving it and the tone arm in horizontal direction around the bearing 64 and the joint 65 slowly towards the outer edge of the record, it being understood the leg or post 61 on the tone arm slides along the lifting table 59 during such movement. A projection 46 on the arm 7 during the outward swing of such arm, as stated, engages the outer end of a spring return pusher rod 47 that has a collar 47ª located within the spring barrel or casing 48, positioned as shown in Figures 1 and 2 and attached to the underside of the top plate 82, as is best shown in Figure 3. Collar 47 compresses the spring 53 within the casing 48, as the arm 7 continues to move towards it.

As the arm 7 continues to move and about reaches the limit of its outward swing (see Figure 2) the outer end of the said arm presses against the upwardly projected arm of a bell crank lever 66 that is fulcrumed in a suitable bearing 15 on the underside of the frame 83 (see Figure 4) the said upwardly projected crank arm being extended in the path of movement of the arm 7 and works through a slot 83ª in the plate 83. The horizontal arm 66ᵇ of the crank lever 66 transmits movement, at predetermined times, to mechanism that operates to allow a single record to drop from the record storage 42 to the turntable 77 in a manner which will be more fully described later. The dropping of the single record is, however, so timed that it will occur when the tone arm 62 is clear of the path of a 12 inch record.

As the cam 1 continues to revolve past the point of extreme travel of the arm 7, the spring 53 forces the rod 47 outwardly against the projection 46 on the said arm 7, and this pushes the arm 7 and the tone arm 62 to a point so that the needle is above the starting line on the record designated 81, and indicated on the diagram Figure 18. In the showing made in this case, as soon as the arm 50, hereinbefore described, has been placed in slot 19, this point corresponds to the starting line 81 of a 10 inch record $r$.

The annular collar 47$^a$ on the rod limits the out-thrust of the said rod 47 by coming against the end of the casing and thereby allows this spring 53, through the rod 47, to push back the arm 7 and the tone arm 62 no further than the point mentioned, at which point the rod will be held until the cycle of movement of the parts is completed.

As the cam 1 continues to revolve, the roller 54 again moves toward the center of the cam allowing the tone arm 62 to deposit the needle on the record on the table 77 in the manner described before. In the mean time, the end of the spring 5, projecting beyond the cam 1, see Figures 1 and 6, comes into contact with a vertical cam guide 18, and being thereby slowly raised, withdraws the detent or block 12 from engagement with the continuously rotating collar 4. The contour of the guide 18 is such that the block 12 is withdrawn from the notch 13 at the same time that the roller 6 is being pressed toward the center of the cam 1 by its tension spring or holder 9.

The cam action, just mentioned, is effected by the upright cam portion 1$^a$ having just passed beyond the roller 6 which latter has now assumed the position shown in Figure 1, by reference to which it will be apparent that as soon as the cam portion 1$^a$ comes into operative position, relatively to the roller 6, the inward pressure of such roller 6 will continue to rotate the cam to the position above mentioned and indicated in Figure 1. The cam 1 being unloaded at this part of the cycle, it moves comparatively freely.

As the roller continues to rotate the cam 1 toward the position shown in Figure 1 of the drawings, the guide 18 further raises the spring 5 until the block 12 is entirely free of the collar 4 and the spring detent 14 snaps into place, thereby holding the spring 5 in its position; the outer end of the spring 5 being free of the guide 18. The cycle is now complete and when the needle again reaches line 79 such cycle is repeated for the next record.

Figure 5:
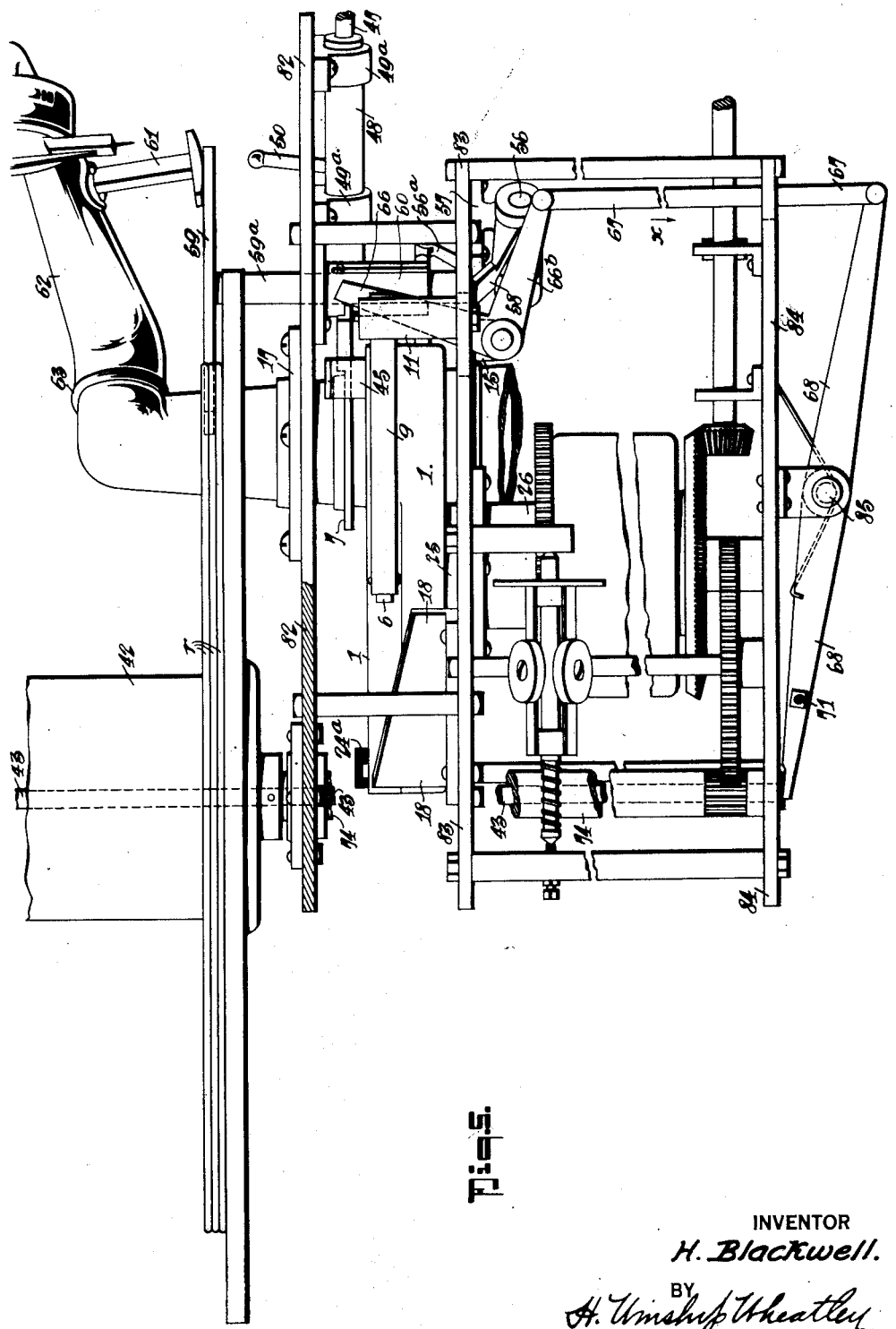
Figure 5 is a similar view of my construction of phonograph, the parts being shown positioned as in Figure 2.

As the cam 1 reaches and carries the tone arm 62 and the arm 7 to the position to approximately that shown in Figure 2, the said arm 7 will have engaged the bell crank lever 66 and brought such lever to the position shown in Figure 5. Motion of the lever 66 is transmitted downwardly through the member 67 (see arrow $x$ on Figure 5) to a rocking beam 68 which, in turn, presses against the bottom of an upright rod 43 and pushes such rod 43 upward.

Figure 4:
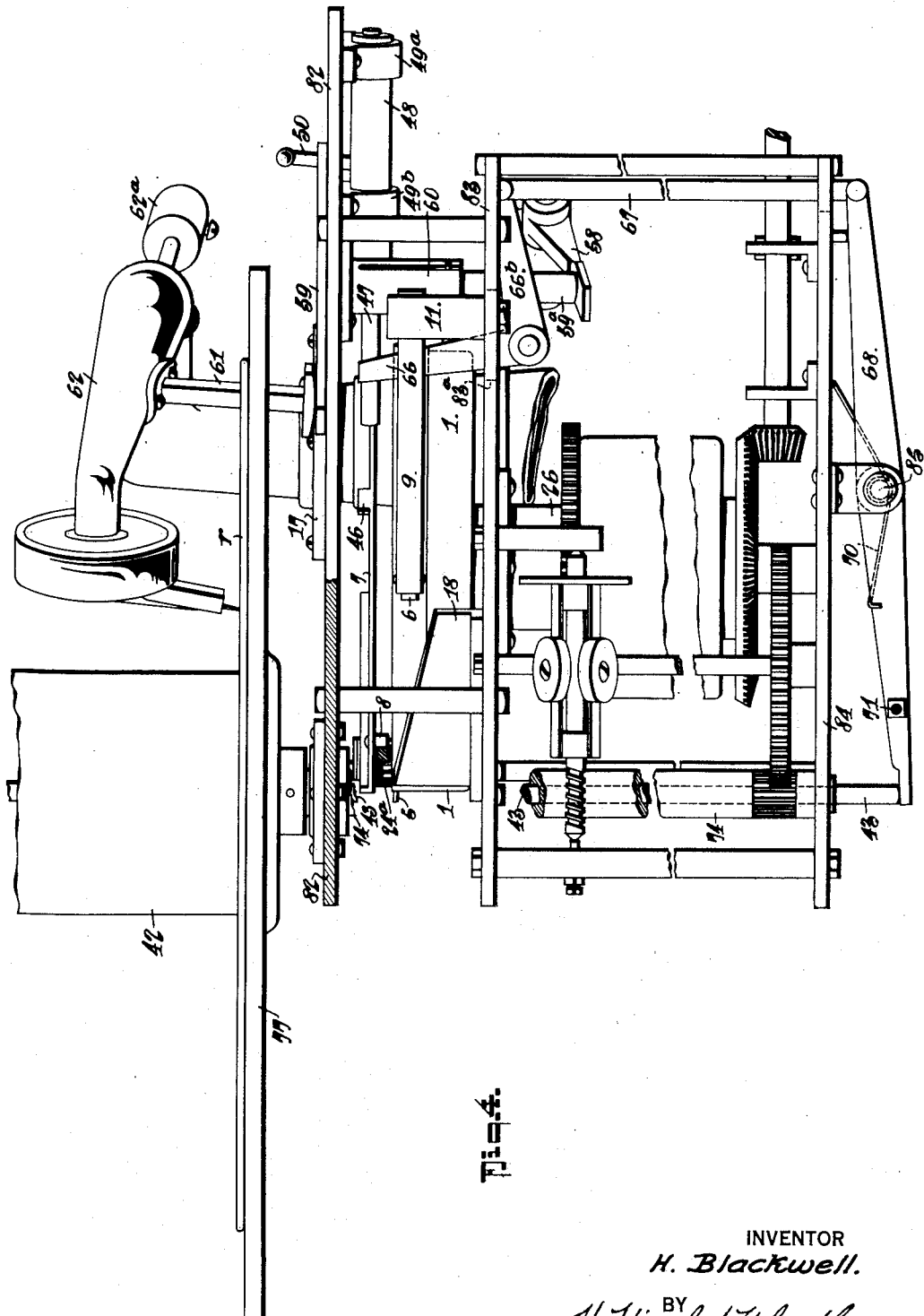
Figure 4 is an end elevation of my multidisk phonograph, the parts being in the position shown in Figure 1, and looking in the direction of the arrow *a* on Figure 1.

The beam 68 is held lightly in the position shown in Figure 4 by a spring 70 and a stop 17 and the said beam 68 is lightly held on its fulcrum 85 so that it has a slight amount of side play, as shown in Figure 15, and for the reason presently to be explained. It should be here stated that when the tone arm 62 and the arm 7 have reached the position indicated in Figure 2, the pusher roller 45 now ceasing its function of pushing the arm 7 outward, the said arm 7 and the tone arm 62 are again moved inwardly toward the center of the record by the spring tension pusher rod 47 until the tone arm 62 reaches its initial or tone groove engaging position, diagrammatically indicated by the midway dotted position shown in Figure 18, it being understood that as the tone arm 62 returns to its starting position, it now having reached the point corresponding to the starting line on the record, by having been pushed back by the spring plunger 47, the said arms 62 and 7 have no further movement until the tone grooves of the newly played record disk carries the tone arm towards the center of the said record.

Referring more particularly to Figures 1 and 3, it will be seen that the shaft 74 driving the table 77 is hollow, allowing rod 43 to pass through it and through the table 77 to the top of the record storage 42. The record storage 42, the detail construction of which is best shown in Figures 8, 9 and 10, includes a series of horizontally disposed slidable detents 27 and a like number of dogs 34. In the construction shown there are three slides or detents 27 and three dogs 34. The several detents 27 and dogs 34 are located at relatively 120°.

The records, designated $r$, used in connection with my invention, have a large hole $r'$, in the center and have the inside edge of such hole bevelled, as shown.

The record storage or cylinder 42 is fastened to the table 77 by any convenient means. In this case, a thread connection is shown, so that the record storage 42, and the records supported thereon, revolve with the table 77.

The members 27 and 34, before referred to, are mounted within the record storage body 42, on a disk 41 that is fastened, by riveting or machine screws, to the inner wall of the said storage body, as shown.

Each member 27 has longitudinally elongated slots 27$^a$, and the several members are slidably held on the disk 41 by rivets 28$^a$— 28$^b$. The members 27 also have stud pins 30 against which small springs 31, held by pins 32 tend to press to maintain the slides 27 against the rod 43, before mentioned.

The dogs 34 are held locked to their outer or operative position by pivoted catches 35 that are held in engagement with the heels 34ᵇ of the dogs 34 by coil springs 36, and when thus held the catches hold the dogs locked with their outer bevelled ends 34ª projected through the vertically elongated slots 42ª in the sides of the storage body 42, as shown.

Springs 33 fastened to pins 32 adjusted so they have no further movement upward than indicated in Figure 3, tend to slightly resist any downward movement of the dogs 34.

The slide detents 27 and dogs 34 constructed in the manner described, being positioned as in Figure 3, as the rod 43 is moved upwards, it begins to compress the spring 39 through the washer 38, held in place on the rod by a pin 37. As the rod rises the tapered head 43ª thereof first engages the slide detents 27 and pushes them out through corresponding slots 42ᵇ in the body 42 until their tapered outer ends pass between the bottom and next to the bottom record.

The upward movement of the rod 43 continues until the slidable members are moved out to their limit, at which position they support the weight of the superimposed records.

An annular projection 44 on rod 43, as the said rod is moved up, as stated, then presses against the catches 35, releasing them from locked engagement with the dogs 34, and as the weight of the bottom record then overcomes the slight tension of the springs 33, allows the dogs 34 to swing or fall down, thereby releasing the bottom record which then falls to table 77 where its impact is cushioned by the air, it being understood that upon the dropping of the bottom record the dogs 34 are pressed into their normal or up position by the aforesaid springs 33.

After the bottom record has been dropped, as stated, and the up movement of the rod 43 ceases, the spring 39 presses rod 43 downward as the arm 7 moves back toward the center of the cam 1. As the annular projection 44 on the rod head 43 moves downward, the springs 36 force the latches 35 back into engagement with and lock the dogs 34, and as the rod 43 is forced still further down, the slidable members 27 are pushed inwardly by springs 31 until they again assume the position shown in Figure 3 of the drawings. This allows the remaining records in the stack to drop down onto the dogs 34 when the cycle of movement is completed.

After finishing playing the records, and they have all dropped from the record storage 42 to table 77, to remove the same, the tone arm 62 is moved to the clear, and the records pulled off over the storage 42. This is possible owing to the fact that the slides 27 are in the position shown in Figure 3 and the dogs 34 have a free upward movement.

The foregoing description covers the operation for 10 inch records. For 12 inch records, the handle 50 is moved to a vertical position, slid back and pushed into the next notch 51, the latter adjustment of the member 50 providing for pushing the tone arm 62 back, corresponding to the starting point of a 12 inch record. If, during the operation of the machine, it is desired to repeat any record, the rod 71, fastened to the beam 68, see Figure 3, is pulled slightly to the left, see arrow 71ª, on Figure 1. This shifts the front end of the beam 68 laterally until it will not engage the rod 43. The lateral play of the beam 68 at its fulcrum point, as before described, makes is possible to move the beam 68 away from contacting with rod 43 as stated. To continue playing new records, the rod 71 is pushed back towards the right to the position shown in Figure 1.

If it is desired to eliminate the automatic features of the machine and to play it as an ordinary phonograph, the record storage is unfastened from the table 77 and it and the rod 43 are moved intact and the cap plates Figures 13 and 14 are substituted, depending upon the character of the hole in the record is is desired to play, and at the same time, the rod 24 is moved in the direction of arrow *t* (see Figure 16) until its angled end 24ª clears pin 8 on the arm 7. In this position, the spring snap 14 will not be tripped and cam 1 will remain in the position shown in the said Figure 1.

The adjusting member or handle 50 is then moved back to engage the notch 52 which brings rod 47 back so far that the lug 46 on arm 7 will not touch it.

The above described mechanism is applicable to phonograph operating mechanism of any description, either spring wound, by using a powerful spring, or electrically operated machines, by providing suitable gear reductions between the table 77 and the main operating cam 1. In the present showing of my invention a very simple type of hand wound spring is indicated, it being understood that the specific means for operating my machine constitute no part of my invention.

Having thus described the detailed construction of my improved phonograph mechanism and generally outlined the operative relation of the so-acting parts that constitute such mechanism, a detailed description of a complete cycle of operation of my automatically actuated mechanism is stated as follows:

Referring to the dot and dash position shown in the diagrammatic figure, Figure 18, and the full line position shown in Figure 1, the needle N being now at the finish of the last tone groove 80 of the record played, or ready to enter the spiral or quick acting groove 78 on the record, carries the tone arm 62 and the arm 7 towards the center of the record, such final movement of the arms 62 and 7 being of importance since such movement thereof operates to release the spring 5 from the catch 14 and thereby start the movement of cam 1 such result being brought about in the following manner:

At the final forward swing of the arm 7, which occurs when the tone arm needle N reaches the innermost groove 79, the stud 8 on the said arm 7 has engaed the inturned member 24ª on the springy end of the arm 24 and moved the snap 14 back to permit the tension of the spring 5 to press the detent on locking member 12 down against the top face of the collar 4 ready for moving down into the notch 13 when the latter comes around under the said member 12. The cam 1 being thus locked to the slowly moving collar 4 by the member 12 moving into the notch 13, begins to revolve slowly.

Assuming the cam 1 to be revolving slowly as just stated, the next step in the complete cycle of movements of the mechanism takes place, that of moving the tone arm and its attached member 7 from the innermost position where it was carried by the quick acting spiral to the outermost position shown in full lines in Fig. 2, and in the full line position of the tone arm 62 with the needle N swung out clear of the records as shown in Fig. 18.

As the cam 1 slowly moves around, the cam face 1ᶜ acts on the roller 54 which pushes the rod 55 back and through such rod movement transmits action to the devices 56, 58, 59ª, 59, 61 for elevating the tone arm from the position shown in Fig. 4 to lift the needle sufficiently to clear the entire stack of records, when played.

Immediately after the tone arm has been lifted so its needle N is held above the disk or disks played, the roller pin 45 engages the member 7 and swings it, with the tone arm, slowly to the outermost position shown in Figs. 18, 5 and 2 and during this movement of the parts stated, tension is being applied to the pusher rod 47 by reason of the projection 46 on the arm 7 pushing the said rod back to the position shown in Fig. 2, near which position the operation of depositing a new disk record into position, and onto the disk last played takes place, the impact of the deposited disk being air-cushioned as before mentioned.

The operation of releasing and depositing another disk record begins to take place just before the roller pin 45 reaches the position shown in Figure 2, at which time the arm 7 engages the bell crank 66 and through the transmitting members 67 and 68 has automatically lifted the rod 43 and through the upward movement of such rod actuated the record disk releasing and sustaining mechanism shown in detail Figs. 10, 11 and 12 and releases the lowermost one of the pack of records r as shown in Fig. 11.

When the depositing of a new record disk to be played has been effected the cam 1 is in the position shown in Fig. 2. As the cam continues to revolve in the direction of the arrow the roller pin 45 tends to move away from arm 7. However rod 47 under its spring tension, and by reason of such rod engaging the projection 46 on the arm 7, causes the said arm 7 and the tone arm 62 to which it is attached to slowly move inwardly following the movement of the roller pin 45 until the arms 7 and 62 reach the starting or midway position indicated by the midway dotted position of the tone arm 62 on Fig. 18, which brings the needle N at a point directly above the outermost or starting tone groove 81 in the record disk as shown. In this case since handle 50 has been placed in slot 19 this point corresponds to the starting line for a 10" record, the flange 47ª on the rod 47 limiting the outward thrust of the rod 47 and thereby bringing the tone arm to the midway position before mentioned.

In the meantime, the movement of the arm 7 just described, towards the center of the cam 1 from the position shown in Fig. 2 has also caused the bell crank 66 to be returned from its position shown in Fig. 5 to its original position shown in Fig. 4, allowing the rod 43 hence the record holding and releasing mechanism, to return to the original position shown in Fig. 9 and described in detail.

The tone arm 62 thus being returned, that is, swung inwardly to the position last mentioned, further movement of the cam 1 has no more effect on the sidewise movement of the tone arm 62 and the arm 7, the roller pin 45 moving away from the arm 7. As soon as the tone arm has reached this position the beginning of the cam face 1ᵇ comes into position for being engaged by the roller 54 which then begins to move slowly in the inward direction towards the center of cam. As the roller pin 45 now recedes from contacting with arm 7, the rod 55 and the roller 54 then move in a direction reverse to that indicated by the arrow on Fig. 1 and the crank member 58 now swinging downwardly, the lifting rod 59ª and the table 59, which were in the position clearly shown in Fig. 5, now gradually lower and thereby permit the needle head of the tone arm to correspondingly gradually lower so that the needle N, which is now directly over the starting groove 81 engages with the said groove 81, it being understood that as the pack of played disks on the table 77 increases in height the tone arm lowers only sufficient to bring the needle N into the tone groove 81, as the drop of the table 59 and the rod 59a continue to the limit of their downward movement.

During the step in the cycle just mentioned another motion has been started namely, the unlocking of the cam 1 from the slowly moving collar 4 brought about in the following manner:

The end of spring 5 that turns with the cam during its motion with the collar 4 continuing to revolve from the position shown in Fig. 2 in the direction of the arrow, engages a fixedly held cam 18, and rising up the incline of such cam its locking block 12 is lifted out of the notch 13 thus disconnecting the cam 1 from the continuously moving collar 4, the notch 13 now moving forwardly away from locking block 12. At the time the spring 5 is thus lifted to release the cam 1, the cam portion 1a of said cam has approached a position just ready for being engaged by the spring pressed roller 6, the latter, as cam portion 1a comes into position, exciting a supplemented rotative motion to the cam 1 sufficient to quickly cause the end of the spring 5 to complete its travel up the incline of the cam 18, and to pass over the inner end thereof. Before passing over the end of the cam 18 however, the spring 5 has been raised to such a height that the spring snap 14 has snapped into position shown in Figures 6 and 7 holding the spring 5 and the locking block 12 free from the moving collar 4. The cam is now in the position as shown in Fig. 1 being held there by roller 6 until the tone grooves of the record carry tone arm 62 and arm 7 to line 79 when cycle is repeated for the next record.

From the foregoing description, taken in connection with the drawing, it is believed the detailed construction of the different elements that constitute my automatically operative phonograph mechanism, the manner in which the different sub-mechanisms co-act and successively come into action during each cycle of movement of the said mechanism, will be readily understood by those skilled in the art to which my said invention relates.

To start the machine, the first record disk of a pack of disks placed in the position on the record storage, and which are held in the elevated position by the detents 37 and 27, is released by manipulating the rod 43 by hand, that is, by pulling up the knob 40 against the tension of its surrounding spring 39, to effect the release adjustment of the members 27 and 34, and thereby deposit the first or innermost one of the pack of the disks. After that has been done, each movement following the said initial starting, that is—the operation of playing the disks, one after the other, until all have been transferred from the top or initial position onto the disk 77, is automatically effected.

To repeat the playing of any of the record disks last deposited into playing position, it is only necessary to pull the rod 70 to the left to disconnect the lever 68 and the rod 43, as before noted.

To eliminate the automatic feature of my invention, remove the record storage 42, pull the handle 24 to the left, as shown in dotted lines in Figure 16, move the handle 50 into the slot 52 and substitute a cap plate 13 or 14 on the table in place of the storage 42, when the machine may be played as an ordinary talking machine.

The detailed arrangement of parts, herein described and specifically illustrated in the drawings, presents a practical means for accomplishing the operation of playing a stack of disk records, one after the other, without stopping the machine; by which the supplying of the new disks, and proper adjustment of the tone arm, are effected to move the aforesaid tone arm out of the way during the mechanical placing of a new record in position to be played, and for likewise returning such tone arm and placing its reproducing needle in the proper tone groove to begin the playing of the new record. It is to be understood that the details of construction may be varied considerably and that it is not my intention to limit my invention to the exact details shown, as the said details may be varied by changing the arrangement, or the omission of some of the parts, and substituting therefor modified mechanical equivalents, or by making such changes that suggest themselves in the practical building of the complete mechanism described, without departing from the spirit of the invention or the scope of the appended claims.

What I claim is:

1. The combination with a sound reproducing machine comprising a rotatable table for accommodating a disk record, means for imparting rotation to said table, and a tone arm including a sound reproducer; of means carried by to rotate with the rotatable table for supporting an overhead pack of disk records and for releasing the said pack of disks one at a time to drop into playing position upon the said rotatable table.

2. The combination with a sound reproducing machine comprising a rotatable table for accommodating a disk record, means for imparting rotation to said table, and a tone arm including a sound reproducer; of means carried by to rotate with the rotatable table for supporting an overhead pack of disk records and adapted to be hand actuated for releasing the said pack of disks one at a time to drop into playing position upon the said rotatable table.

3. The combination with a sound reproducing machine comprising a rotatable table for accommodating a disk record, means for imparting rotation to said table, and a tone arm including a sound reproducer; of means carried by to rotate with the rotatable table and readily removable therefrom for supporting an overhead pack of disk records and for releasing the said pack of disks one at a time to drop into playing position upon the said rotatable table.

4. In a talking machine of the character described in, which is included a record carrying turntable and a record storage comprising a cylindrical body mounted upon to rotate with and projected axially from the turntable, and means on the said body for suspending a pack of records in superimposed relation above the said turntable, the said means being adapted at predetermined times through devices actuated by a moving part of the machine for successively releasing the bottom one of the pack of records.

5. In a sound reproducing machine, the combination with a rotatable talking machine record support; of means mounted on said rotatable record support to rotate therewith for supporting a pack of talking machine records in superimposed relation upon and above the rotatable record supporting means, and arranged to constitute rests upon which the pack of records are sustained, and means automatically operating to release the lowermost record of the pack to permit its dropping onto the record on the rotatable support.

6. In a phonograph, sound reproducing mechanism, which mechanism includes a laterally and vertically oscillatable tone arm; means for supporting a pack of record disks in superimposed relation upon and above the turntable of the reproducing mechanism to rotate therewith, connections operable during each complete cycle of movements of the said sound reproducing mechanism for releasing the lowermost one of the pack of records to drop such record onto a previously played record on the turntable.

7. The combination with a sound reproducing machine comprising a rotatable table for accommodatng a disk record, means for imparting rotation to said table, and a tone arm including a sound reproducer; of means carried by to rotate with the rotatable table for supporting an overhead pack of disk records, means for releasing the said pack of disks one at a time to drop into playing position upon the said rotatable table, and means automatically actuated by movement of the tone arm for causing said releasing means to function.

8. In a sound reproducing machine, the combination with a record holding turntable; of a record storage mounted upon and rotatable with the table, a pack of records held in superimposed relation and each centrally apertured whereby the entire pack may be readily placed over the top of the record storage, means on the storage and cooperative with the edges surrounding the apertures of the records of the pack for sustaining the pack in suspension over the turntable, and means for automatically shifting the record sustaining means for dropping the lowermost of the pack of records onto the table or previously played record.

9. The combination with a talking machine including a laterally movable tone arm and a storage for suspending a pack of superimposed record disks above the turntable of the talking machine; of means for releasing the lowermost one of the pack of records to cause it to drop into position for being played, mechanism operated by the tone arm for effecting the release of said record as the said arm passes outwardly and beyond the played record, the said releasing mechanism including a member adapted for being hand manipulated to effect the release of the aforesaid lowermost record.

10. In a multi-disk phonograph; in combination with the rotating record disk carrier, an axially disposed cylindrical body mounted upon to rotate with and extending vertically from the carrier, a plurality of disk records held in superimposed relation and each having a central aperture whereby the said disks are adapted for being placed downwardly over to be in slidable engagement with the said cylindrical body, means on the said body for progressively releasing the bottom ones of the pack of disks and other means controlled by the rotation of the record disk carrier after a placed record has been played for setting into action the disk releasing mechanism whereby to place a new record on top of the record last played.

11. In a sound reproducing machine, the combination with a record holding turntable; of a record storage mounted upon and rotatable with the table, a pack of records held in superimposed relation and each centrally apertured whereby the entire pack may be readily placed over the top of the record storage, means on the storage and cooperative with the edges surrounding the central apertures of the records for sustaining the pack in suspension over the turntable, and means for automatically shifting the records sustaining means for dropping the lowermost of the pack of records onto the table or previously played record, the said shifting means including an actuating member and power transmission devices actuated from a moving part of the machine for effecting the dropping of a record after the prior record has been played.

12. In a talking machine, the combination with a record carrying turntable, a record storage mounted upon and movable with the turntable, the said storage comprising a vertical hollow cylindrical body, a set of detents mounted on the said body for being normally projected radially therefrom and into engagement with the edges surrounding the central apertures of the pack of records to constitute a primary means for sustaining the said pack of records, another set of detents on the body for being projected radially therefrom and constituting a secondary means for sustaining the remainder of the pack as the lowermost record is released, automatically operated means cooperative with the storage body adapted when actuated for shifting the secondary sustaining means into position for engaging the remainder of said pack of records and for shifting the primary record sustaining means to the record releasing position, and means adapted to be finger engaged whereby the records releasing means may be manually operated.

13. In a sound reproducing machine, the combination with the rotatable record support; of a record storage detachably connectable to the rotatable record support to rotate therewith, a pack of records held in superimposed relation upon the storage and above the rotatable table, horizontal spring-actuated detents that normally project under the pack of records to sustain the said pack of records at an elevated position, horizontal spring-actuated detents that are normally drawn inward from engagement with the said pack of records, and lever and cam devices operating to shift the normally retracted detents into engagement with the bottom one of the pack of records next that one which is to be dropped from the pack and to release the normally projected detents to permit the same to move inwardly out of engagement with the records to permit the bottom one of the record pack to drop.

14. In a talking machine, a rotatable record support comprising a centrally disposed vertical cylindrical body and an annular base upon which records are held, a pack of centrally apertured record disks held in superimposed relation and slidably movable along the cylindrical body, means mounted on the body for holding the pack of records in suspension on such body and above the annular base, the said means including detents spring-actuated to move under the pack of records in cooperation with the edges surrounding central apertures thereof and constituting the supports for such pack, other detents normally held within the confines of the cylindrical body, and means for tripping the record supporting detents to project the slidable ones thereof between the lowermost one and the next succeeding one of the record pack and for releasing the lowermost one of the records of the pack whereby to drop the lowermost record and sustain the remaining ones of the pack as the other detents return to their normal or record supporting position.

15. In a sound reproducing machine, the combination with a rotatable record holder, of means mounted upon the rotatable record holder to turn therewith for supporting a pack of records in superimposed relation above the record on the said holder, the said means including detents normally projected by spring tension under the pack of records, other detents normally retracted and adapted for being projected under next to the lowermost one of the pack of records to temporarily support the remainder of the pack of records as the lowermost one of the pack of records is released to drop onto the record on the holder, and lever and cam devices for retracting the normally projected detent to release the lowermost record and for projecting the other detents for temporarily holding the remaining pack of records, the projecting action taking place before the retracting action.

16. In a talking machine, a rotary record support, a storage receptacle consisting of a hollow cylindrical body that is centrally mounted upon and projected upwardly from the rotary record support, and movable with such a support, a series of centrally apertured record disks held in pack form and slidable on to the cylindrical body, means on the said body for primarily sustaining the pack of records in suspension over the rotary record support, a secondary means on the said body adapted for being radially projected between the lowermost pair of records of the pack when the other record supporting means is adjusted for disengaging the records and mechanism actuated at predetermined times through a moving part of the talking machine for setting into action the secondary means to project the same under the next to the lowermost record of the pack to sustain the same and the records thereabove and for disengaging the means that primarily sustains the record pack to permit the lowermost record to drop upon the record support.

17. In a talking machine, the combination with a rotary record support, a storage for sustaining a pack of centrally apertured records above the rotary record support, said storage comprising a cylindrical body adapted for being attached to the record support to rotate therewith and on which the pack of records are slidably held, means for sustaining a pack of records placed over the top of the cylindrical body, the said means including a pivoted detent spring held to normally project beyond the body, a slidable detent normally held indrawn within the body, the said pivoted detent constituting a bottom support for the pack of records mounted on the body, the slidable detent being adapted for being radially projected between the lowermost pair of records in the pack and means for effecting the outward projection of the slidable detent to sustain the remainder of the pack of records and for effecting the release of the pivoted detent whereby to release the lowermost one of the pack of records to permit it to slide down the storage body onto the previously played record.

18. In a talking machine, the combination with a rotating table on which the records are received; of a record storage comprising a hollow cylindrical body axially mounted upon and rotatable with the table, a pack of record disks held in superimposed relation, the disks being each centrally apertured whereby they can have vertical movement singly or in pack form along the aforesaid cylindrical body, detents horizontally sustained within the cylindrical body normally projected radially through the said body to constitute supports for the pack of records, other horizontally sustained detents within the hollow body and normally drawn inwardly within the circumferential confines of the hollow body, the latter having openings through which the several sets of detents are projected, and a cam device including an actuating member projected beyond the ends of the hollow body and adapted for engaging the several sets of detents whereby when shifted in one direction to cause a projecting of the normally indrawn detents to cause them to sustain all but the lowermost one of the pack of records and effect a release of the other set of detents to permit the lowermost record to slide thereover and drop upon the rotating table.

19. In a talking machine, the combination with a rotary record support, a storage for sustaining a pack of centrally apertured records above the rotary record support, said storage comprising a cylindrical body adapted for being attached to the record support to rotate therewith and on which the pack of records are slidably held, means for sustaining a pack of records placed over the top of the cylindrical body, the said means including a pivoted detent spring held to normally project beyond the body, a slidable detent normally held indrawn within the body, the said pivoted detent constituting a bottom support for the pack of records mounted on the body, the slidable detent being adapted for being radially projected between the lowermost pair of records in the pack, means for effecting the outward projection of the slidable detent to sustain the remainder of the pack of records and for effecting the release of the pack of records and for effecting the release of the pivoted detent to release the lowermost one of the pack of records to permit it to slide down the storage body and onto the previously played record, the said pivoted detent being adapted for free movement upwardly to allow its record engaging end to be moved within the confines of the storage body when a pack of played records are lifted off the said storage body.

20. In a sound reproducing machine, the combination with the rotatable record support; of a record storage detachably connectible to the rotatable record support to rotate therewith, a pack of records held in superimposed relation upon the storage and above the rotatable support, horizontal spring-actuated detents that normally project under the pack of records to sustain the said pack of records at the elevated position, horizontal spring-actuated detents that are normally drawn inward from engagement with the said pack of records, means operating to force the normally inwardly drawn detents outwardly into engagement with the remainder of the pack of records as the bottom one of the record pack is released and to release the normally projected detents first from engagement with the said bottom one of the pack of records, the said means including a cam device normally spring returned to a position out of engagement with the detents, a pusher member for shifting the said cam into active engagement with the detents, and means operated by a moving part of the sound reproducing machine for shifting the said pusher member at a predetermined time after a record has been played to thereby provide for dropping another record into the position to be played.

21. In a talking machine, a rotatable record support comprising a centrally disposed vertical cylindrical body and an annular base upon which records are held, a pack of centrally apertured record disks held in superimposed relation and slidably movable along the cylindrical body, means mounted on the body for holding the pack of records in suspension on such body and above the annular base, the said means including detents spring-actuated to move under the pack of records and constitute the supports for such pack, other detents normally held within the confines of the cylindrical body, and means for tripping the record supporting detents to release the pack and for projecting the slidable detent between the lowermost one and the next succeeding one of the record pack, whereby to drop the lowermost record and sustain the remaining ones of the pack as the other detents return to their normal or record supporting position, the record supporting detents being normally swung outwardly under spring tension, spring held latch members for locking the said detents to their projected positions, the releasing means including a member for tripping the latches of the record supporting detents, and a cam for moving the slidable detents between the lowermost pair of records, the said cam operating to actuate the slidable detents in advance of tripping the latches for the other detents.

22. In a talking machine, the combination with a record carrying turntable, driving mechanism therefor, and a tone arm swingable over the turntable and vertically oscillatable with respect to the said turntable; means set into motion by the driving mechanism for lifting the tone arm, swinging it outwardly clear of a record carried by the turntable, and controlling its return above and the lowering thereof into cooperation with the start of that record, and means engaged by the tone arm during a portion of its outward swing and acting to store up energy to force the same to cooperative operation with the said controlling action.

23. In a phonograph, the combination with the sound reproducing mechanism which includes a record turntable shaft and a laterally and vertically shifted tone arm, of a supplemental shaft parallel with the turntable shaft, and means for driving the turntable shaft at a relatively high speed and the supplemental shaft at a relatively slow speed, a cam loosely mounted on the supplemental shaft, means automatically operating during each complete cycle of rotation of the cam for locking the said cam to its shaft to turn therewith, and for releasing the cam from the shaft, and a member on the cam that engages the tone arm and slowly returns it to its outermost position after the record has been played.

24. In a talking machine, the combination with a movable sound reproducing mechanism in which is included a rotary record carrier and a vertically and laterally swinging tone arm; of a shaft, a cam loosely mounted on the said shaft, power transmission means for imparting rotation to the record carrier and the cam shaft in like direction and with the cam shaft slowly rotatable with respect to the relatively fast rotation of the turntable, a latch device on the cam that automatically locks the cam to the shaft, a supplemental cam that engages the latch and lifts it out of its locked engagement with the cam shaft, the said latch device being adapted for being disengaged from the supplemental cam under a supplemental rotation of the cam and devices for effecting the said supplemental rotative motion of the said cam.

25. In a talking machine, the combination with a record carrying turntable, driving mechanism therefor, and a tone arm swingable over the turntable and vertically oscillatable with respect to the said turntable; of means set into motion by the driving mechanism for lifting the tone arm, swinging it outwardly clear of a record carried by the turntable, and controlling its return above and the lowering thereof into cooperation with the start of that record, means engaged by the tone arm during a portion of its outward swing and acting to store up energy to force the same to cooperative operation with the said controlling action, the said last named means including a pusher rod normally projected by spring pressure and a member associated with the tone arm for engaging the pusher rod to force it against the pressure of the spring.

26. In a sound reproducing machine, the combination with the record carrying turntable and the tone arm, said arm being laterally swingable and vertically oscillatable with respect to the said turntable; of a record storage including a pack of records held in superimposed relation above the turntable, mechanism that automatically releases the bottom one of the pack of records to permit the said bottom record to drop onto the turntable, the said mechanism including a vertically shiftable actuating rod, a rockably mounted lever, one end of which engages the said actuating rod, means connected to the other end of the lever for rocking such lever and which is set into operation by the tone arm when it is swung out from over the turntable, and a hand controlled member for shifting the rocking lever to disconnect it from contact with the vertically shiftable rod.

27. In a phonograph, the combination of a continuously moving record carrier and an intermittently relatively slowly moving rotary cam operating in clockwise direction with the rotary carrier, a sound reproducer including a tone arm fulcrumed for vertical and lateral movement, means set into action by engagement with a part of the cam for lifting the reproducer, means on the rotary cam for engaging the tone arm after it has been lifted and adapted to swing the said tone arm to the limit of its outermost position, means whereby the said tone arm in its outward movement will store up energy for returning it to a point above its initial or record sound groove engaging position, the said energy storing being set into action through the cam movement, the said cam also including a portion adapted to engage the tone arm lifting means to effect a lowering of the tone arm into cooperative relation with the initial groove of the record.

28. In a talking machine, a turntable having a driving shaft, a supplemental shaft parallel with the turntable, means for effecting a relatively fast rotation to the turntable shaft and a relatively slow rotation to the supplemental shaft, sound reproducing mechanism including a vertically and laterally oscillatable tone arm, a cam loosely mounted on the supplemental shaft, a latch carried on the cam adapted to automatically interlock with the supplemental shaft and cause the cam to rotate with the said supplemental shaft during a portion of the complete rotation of the said shaft and become disconnected from its locked engagement with the supplemental or cam carrying shaft at predetermined times, other means for causing the latch to move back into locked engagement with the cam shaft, the cam having a member adapted for engaging the tone arm when the said arm is at its innermost position to cause it to move outwardly to its initial position beyond the outer edge of the record turntable.

29. In a talking machine, the combination with a movable sound reproducing mechanism in which is included a rotary record carrier and a vertically and laterally swinging tone arm; of a shaft, a cam loosely mounted on the said shaft, power transmission means for imparting rotation to the record carrier and the cam shaft in like direction, and with the cam shaft slowly rotatable with respect to the relatively fast rotation of the turntable, a latch device on the cam that automatically locks the cam to the shaft, a supplemental cam that engages the latch and lifts it out of its locked engagement with the cam shaft, the said latch device being adapted for being disengaged from the supplemental cam under a supplemental rotation of the cam, devices for effecting the said supplemental rotative motion of the said cam, the said devices comprising an abruptly inclined cam surface and a spring pressed pusher that engages the said cam surface as the said surface is moved into alignment with the pusher.

30. In a talking machine including a cabinet top plate, the combination with a rotary record support, a vertically and laterally oscillatable tone arm, a cam carrying shaft, drive mechanism for imparting movement to the support and the cam carrying shaft in like direction and with the cam shaft rotative at a relatively slow speed with respect to the rotary record support, a cam on the cam shaft, a projection on the cam adapted for engaging the tone arm and swinging it back to its outermost or initial position, means rendered active by the cam rotating with the cam shaft for effecting a positive lifting of the tone arm to cause it to clear the rotary record support before the said arm is swung outward and for positively lowering the said tone arm into its initial sound reproducing position on the record being played, the said means including a bell crank lever below the cabinet top plate and adapted to vertically move a table situated above the said cabinet top plate and upon which the tone arm is supported.

31. In a talking machine, the combination with the record turntable, a cam carrying shaft, means for driving the turntable and the cam carrying shaft in like direction, a tone arm fulcrumed for vertical and lateral movement with respect to the turntable, a cam loosely mounted on the cam shaft, a latch member on the cam tending to normally interlock with the cam shaft to cause the cam and the shaft to move together, the tone arm including a supplemental member, a fixed cam with which the latch engages as it travels around with the rotary cam and is thereby lifted out of active position, a detent that holds the latch to its lifted position, the said supplemental member on the tone arm being positioned for effecting an engaging and tripping of the latch to release it and to permit it to assume its cam shaft engaging position, and other means carried by the turntable for imparting a supplemental inward thrust to the tone arm after the sound grooves of the record have been traversed whereby the said supplemental member is caused to engage and trip the aforesaid detent.

32. In a talking machine, the combination with a rotary record support, a cam carrying shaft, drive mechanism for imparting movement to the rotary support and the cam carrying shaft in like direction and with the cam shaft rotative at a relatively slow speed with respect to the rotary record support, a cam on the cam shaft, a tone arm vertically and laterally oscillatable, a projection on the cam for engaging the tone arm whereby to move it outwardly beyond the record support, means rendered active by the movement of the cam for effecting a positive lifting of the tone arm to cause it to clear the played record before the said arm is swung outwardly, the said arm lifting means including a vertically movable table that constitutes a support for the outer end of the tone arm, a rock shaft having a crank member for engaging and lifting the vertically movable table and means cooperative with and actuated by the cam that moves with the cam shaft for effecting a rocking of the said rock shaft.

33. In a sound reproducing machine; the combination of a relatively fast moving rotary carrier, a sound reproducer including a tone arm fulcrumed to swing laterally and vertically, a relatively slowly moving cam shaft, means for imparting motion to the record carrier and the cam shaft synchronously, and in like direction, a cam on the cam shaft, means for locking and releasing the cam with and from the cam shaft, the cam locking and releasing means being effected during each cycle of movement of the record and the cam, means actuated by the cam when locked to its shaft for lifting the sound reproducer from the record groove after the record has been played and for lowering the same again into the start of the record groove after the reproducer has been moved beyond the record and returned to a point above said groove start, other means actuated by movement of the cam for moving the reproducer to a point beyond the record, and still other means controlled by the cam movement for returning the reproducer to the point above the groove start.

34. In a talking machine, a turntable, sound reproducing mechanism including a tone arm that is vertically and laterally oscillatable with respect to the turntable, a cam shaft, a cam loosely mounted on the cam shaft, a latch member carried on the cam and adapted as the cam shaft rotates to engage the cam shaft and lock the cam to turn with the said cam shaft, a fixed cam device for lifting the latch out of locked engagement with the cam shaft at times, a detent for holding the said latch at its cam shaft released position, a supplemental member attached to and movable with the tone arm, the said member having a lug adapted for engaging with the detent and adjusting it to permit the latch to assume its cam shaft locking adjustment and means cooperative with the turntable for imparting a supplement and quick impulse to the tone arm after the record has been played whereby to move the detent out of its locked engagement with the outer end of the latch, and thereby bring the said latch in position for again interlockably engaging with the cam shaft.

35. In a talking machine, the combination with a record carrying turntable, driving mechanism therefor, and a tone arm swingable over the turntable and vertically oscillatable with respect to the said turntable; of means set into action by the driving mechanism for lifting the tone arm, swinging it outwardly clear of a record carried by the turntable and controlling its return above and the lowering thereof into co-operation with the start of that record, means engaged by the tone arm during a portion of its outward swing and acting to store up energy to force the same to cooperative operation with the said controlling action, the said last named means including a pusher rod normally projected by spring pressure and a member associated with the tone arm for engaging the pusher rod to force it against the pressure of the spring, and devices for setting the pusher rod relatively to the engaging member associated with the tone arm whereby to regulate the amount of the spring impelled movement of the pusher rod to adapt the same to cooperation with varied sizes of records and to render the same inactive when desired.

36. In a talking machine including a cabinet top plate, the combination with a rotary record support, a vertically and laterally oscillatable tone arm, a cam carrying shaft, drive mechanism for imparting movement to the support and the cam carrying shaft in like direction and with the cam shaft rotative at a relatively slow speed with respect to the rotary record support, a cam on the cam shaft, a projection on the cam adapted for engaging the tone arm and swinging it back to its outermost position, means rendered active by the cam rotating with the cam shaft for effecting a positive lifting of the tone arm to cause it to clear the rotary record support before the said arm is swung outward and for positively lowering the said tone arm into its initial sound reproducing position on the record being played, the said means including a bell crank lever below the cabinet top plate and adapted to vertically move a table situated above the said cabinet top plate and upon which the tone arm is supported, and spring actuated means for automatically returning the tone arm back to its initial or record engaging position as it is being simultaneously lowered to engage with the record.

37. In a talking machine, the combination with a record carrying turntable, driving mechanism therefor, and a tone arm swingable over the turntable and vertically oscillatable with respect to the said turntable; of means set into action by the driving mechanism for lifting the tone arm, swinging it outwardly clear of a record carried by the turntable and controlling its return above and the lowering thereof into cooperation with the start of that record, means engaged by the tone arm during a portion of its outward swing and acting to store up energy to force the same to cooperative operation with the said controlling action, the said last named means including a pusher rod normally projected by spring pressure, a member associated with the tone arm for engaging the pusher rod to force it against the pressure of the spring, devices for setting the pushing rod relatively to the engaging member associated with the tone arm whereby to regulate the amount of the spring impelled movement of the pusher rod to adapt the same to cooperation with varied sizes of records and to render the same inactive when desired, the said devices including an adjustable finger and slot connections cooperative with the pusher rod for the purposes specified.

38. In a talking machine, the combination with a record carrying turntable, driving mechanism therefor, and a tone arm swingable over the turntable and vertically oscillatable with respect to the said turntable; of means set into motion by the driving mechanism for lifting the tone arm, swinging it outwardly clear of a record carried by the turntable and controlling its return above and the lowering thereof into cooperation with the start of the record, means engaged by the tone arm during a portion of its outward swing and acting to store up energy to force the same to cooperative operation with the said controlling action, the said last named means including a pusher rod normally projected by spring pressure, a member associated with the tone arm engaging the pusher rod to force it against the pressure of the spring, devices for setting the pusher rod relatively to the engaging member associated with the tone arm whereby to regulate the amount of the spring impelled movement of the pusher rod to adapt the same to cooperation with varied sizes of records and to render the same inactive when desired, the said devices including an adjustable finger and slot connections cooperative with the pusher rod.

HOWARD BLACKWELL.